Sept. 10, 1968    W. P. MILLER II    3,400,443
METHOD OF AT LEAST PARTIALLY REMOVING A TIRE STUD FROM A TIRE
Filed Sept. 7, 1965
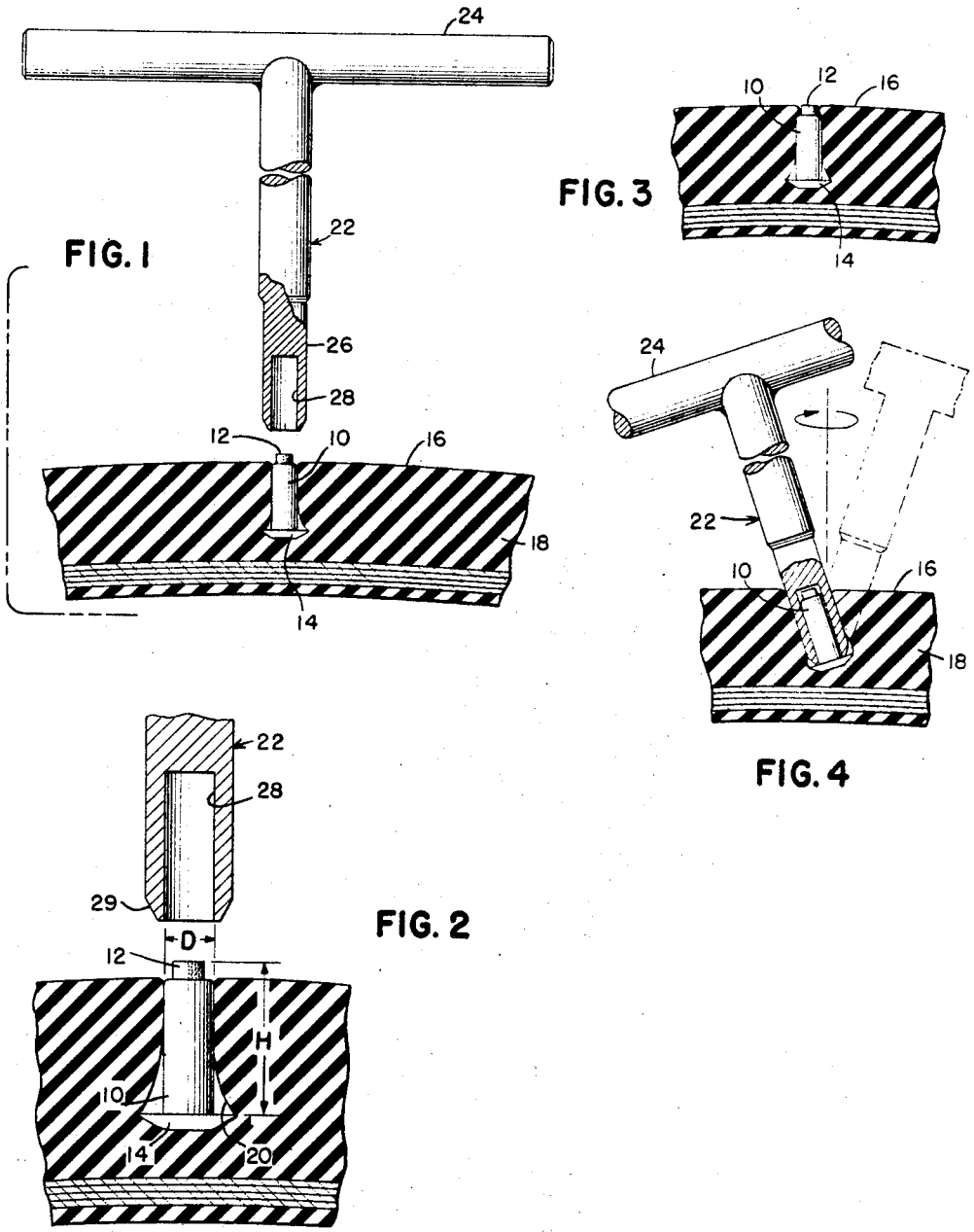
INVENTOR.
WILLIAM P. MILLER, II
BY
J. B. Holden
ATTORNEY

United States Patent Office 3,400,443
Patented Sept. 10, 1968

3,400,443
METHOD OF AT LEAST PARTIALLY REMOVING A TIRE STUD FROM A TIRE
William P. Miller II, Akron, Ohio, assignor to The Goodyear Tire & Rubber Company, Akron, Ohio, a corporation of Ohio
Filed Sept. 7, 1965, Ser. No. 485,379
5 Claims. (Cl. 29—400)

ABSTRACT OF THE DISCLOSURE

A method of removing or adjusting a tire stud from or in a recess in a tire, which recess is either preformed during curing of the tire or is provided after curing of the tire. The stud is inclined relative to the axis of the recess, as formed, and one end of the stud is revolved about said axis thereby effecting movement of the stud outwardly of the recess.

The foregoing abstract is not to be taken as limiting the invention of this application, and in order to understand the full nature and extent of the technical disclosure of this application, reference must be made to the accompanying drawing and the following detailed description.

---

This invention relates to a novel and improved tool and method for adjusting the height of a traction stud in a tire.

The use of metallic studs in a tire for the purpose of providing increased traction is well known. Such studs may be molded into the tread during curing of the tire or may be inserted into preformed recesses in the tread after the tire has been molded. Such preformed recesses may be molded in the tread or provided in a cured tire such as by drilling. This invention is concerned with the accurate location of such studs in such preformed recesses.

A known construction of a stud of a general type with which this invention is concerned comprises a generally cylindrical body adapted to be coaxially received within a preformed recess in a rubber tread of a tire with the body having at least one radially outwardly extending flange at the end of the stud intended to be seated in the preformed recess. Such flanges serve to anchor the stud in the recess and prevent the stud from being thrown out of the tire by centrifugal force. However, when the stud is forcibly seated in the recess, it may be inserted too deeply so that the outer end of the stud does not project a sufficient distance beyond the next adjacent outer surface of the tread. Heretofore, the correction of this condition by partially withdrawing the stud from the recess has been difficult to accomplish due to the anchor flange effectively serving its intended purpose of impeding movement of the stud outwardly of the recess. For example, a force of as much as 90 pounds may be required to move such a stud axially outwardly of the tire. Also, such a stud is of relatively small diameter and when inserted too deeply in the tread projects only a small distance beyond the outer tread surface making gripping of the stud difficult.

It is an object of this invention to provide a novel and improved manually operable tool which will facilitate movement of a traction stud outwardly of a preformed recess in a tire tread particularly when the stud has been inserted too deeply in the tread and which may be used with advantage without the exercise of any particular skill.

It is further an object of this invention to provide such a novel and improved tool which is particularly adapted to use in the field by retreaders or by personnel associated with tire sales outlets.

It is still another object of this invention to provide a novel and improved method of adjusting the height of traction studs received in a preformed recess in a tire tread.

Other objects of the invention will in part be obvious and will in part be apparent hereinafter.

The invention accordingly comprises a tool possessing the features and properties and the relation thereof to elements associated therewith, and comprises the several steps and the relation of one or more of such steps with respect to each of the others thereof, which will be exemplified in the tool and method hereinafter described, and the scope of the invention will be indicated in the claims.

For a fuller understanding of the nature and objects of the invention, reference should be had to the following detailed description taken in connection with the accompanying drawing in which:

FIG. 1 is an elevational view, partly in section, of a tool constructed in accordance with this invention shown in association with a stud, of a type with which this invention is concerned, located in a preformed recess in a tire tread;

FIG. 2 is an enlarged, fragmentary, cross-sectional view of the tool of FIG. 1 in association with the stud and tire of FIG. 1;

FIG. 3 is a fragmentary, cross-sectional view of a tire tread with the stud of FIG. 1 inserted too deeply within the tread; and FIG. 4 is a view similar to that of FIG. 1 illustrating the novel method of this invention and the use of the tool of this invention in such method.

With reference to FIGS. 1 and 2, a stud of a type with which this invention is concerned comprises an elongated, generally cylindrical body 10, preferably of metal and having a hardened tip 12. The tip 12 may be provided by a cylindrical insert, such as of tungsten carbide, located in a recess or bore extending coaxially of the stud body 10 and projecting beyond one end of the stud body. The stud further comprises at least one radially outwardly projecting anchoring portion or flange 14 integral with the stud body and spaced a substantial distance from the tip 12 in the direction toward the other end of the stud body. In the specific embodiment shown the anchor flange 14 is located at the end of the body 10 opposite the tip 12 and is in the general shape of a spherical segment having its axis coincident with the axis of the body 10. The stud is adapted to be received coaxially within a preformed, cylindrical recess extending generally radially inwardly of the road contacting surface 16 of a tire tread 18 of natural or synthetic rubber. The recess, as formed, has a diameter substantially less than the diameter of the stud body 10 and has a depth or length, as formed, which is substantially less than the dimension of the stud from the end thereof corresponding to the flange 14 to the end of the body 10 from which the tip 12 projects. Thus, the diameter of the preformed recess, before the stud is inserted therein, is substantially less than the maximum width of the flange 14, and when the stud is inserted in and bottomed in the recess the sidewall 20 of the recess will firmly engage the outer portion of the stud body and will be flared outwardly from intermediate the ends of the stud body 10 to the maximum width portion of the flange 14. After a minor amount of running of the tire the tread rubber forming the sidewall of the recess will recover and conform at least substantially fully to the shape of the portion of the stud received in the recess.

With reference to FIG. 3 it is possible to seat the stud within the recess with sufficient force that the stud will project little, if any, distance above the tread surface 16. In this situation, while the tread rubber forming the bordering portions of the recess is deformed so the bottom of the recess acts on the bottom of the stud to tend to urge the stud outwardly of the treads, the outwardly facing circumferential edge portion of the flange 14 effectively prevents such movement. It is desired that the stud be located in the recess with the bottom of the stud seated on the bottom of the recess and with the tip 12 projecting beyond the tread surface 16 on the order of .050 inch. With the stud properly located, it is further preferred that the bottom of the recess in the tread be displaced inwardly of the tread sufficiently to assure firm contact between the bottom of the stud and the bottom of the recess.

Thus, with the stud inserted too deeply in the tread as shown in FIG. 3, it is necessary to withdraw the stud partially from the recess in the tread until the tip 12 projects the desired distance beyond the tread surface 16. A specific stud of an exemplary type with which this invention is concerned has a diameter D of the body 10 of about .200 inch with the tip 12 having a diameter of about .110 inch and initially projecting from the body a distance of about .060 inch. The overall length of the stud is about .600 inch and the outer diameter of the flange 14 is about .350 inch. Such a stud is adapted to be received in a preformed cylindrical hole having a diameter of about .100 inch and having a depth on the order of .500 inch. With the study properly seated in the hole in the tire, the tip 12 of the stud should project beyond the tread surface a predetermined distance which may be on the order of .060 to .080 inch. For this example, it may be assumed that it is not desired that the tip 12 project less than .060 inch nor more than .080 inch and that within this range the bottom of the stud will be seated on the bottom of the hole.

If the stud is inadvertently seated too deeply in the preformed hole so that, for example, the tip 12 is more or less flush with the tread surface, as illustrated in FIG. 3, the tool of this invention will facilitate partial withdrawal of the stud in a manner which may be relatively finely controlled so as accurately to adjust the amount of projection of the tip 12. With reference to FIGS. 1 and 2, a specific embodiment of a tool constructed in accordance with this invention comprises an elongated cylindrical body or stem 22, preferably of metal and having a manually graspable handle portion 24 extending at right angles across and rigidly secured to one end of the stem 22. The stem 22 is reduced in diameter or stepped down, as at 26, over the end portion thereof opposite the handle 24. The stem 22 is provided with a cylindrical opening 28 extending coaxially of the stem from the end surface thereof opposite the handle 24. In the specific embodiment shown, the opening 28 terminates intermediate the ends of the stem and, in accordance with the invention, has a length which is at least as great as the dimension H between the outer end of the stud tip 12 and the next adjacent surface of the flange 14 of the stud. The diameter of the opening 28 is slightly greater than the maximum diameter of the portion of the stud body 10 which is adapted to be received within the opening 28 so that the stud body will be freely receivable within the opening 28. The outer diameter of the portion of the stem 22 which is adapted to surround the stud body is preferably no greater than the outer diameter of the stud flange 14. The end of the stem 22 opposite the handle 24 is tapered or chamferred, as at 29, to facilitate insertion of the tool in the tire tread and about the stud. This tapering also assures that this end of the stem will have a terminal diameter which is no greater than the outer diameter of the flange 14.

In the use of the tool of this invention to adjust the projection of a stud in accordance with the method of this invention, the end of the tool opposite the handle 24 is inserted into the tire tread and telescopically over the stud, and the end of the tool is bottomed on the surface of the flange 14 facing outwardly of the tire. The tool is then inclined so that the axis of the stem 22 is inclined relative to the axis that the preformed hole receiving the stud had when it was formed, and the stem is then revolved in this inclined position about said axis of the preformed hole without exerting any significant inward force on the stud. The stud portion received within the stem 22 will be similarly inclined by cooperative engagement with the sidewall of the opening 28, whereby the axis of the stud will be inclined relative to the axis of the preformed recess, as formed, and will intersect said axis of the recess, as formed, at a point spaced between the ends of the stud. The revolution of the tool will effect a corresponding revolution of the stud, during which movement the radially outer edge of the stud flange 14 will be cooperably engageable with the side wall of the preformed hole in the tread to effect a movement of the stud outwardly of the tread. This movement of the stud is believed to be due in part to an action of the flange 14 something in the nature of a self tapping screw and in part to force acting on the bottom of the stud due to the deformation of the bottom of the preformed hole when the stud is inserted in the tire. It will be apparent that when the tool is located over the stud and bottomed on the flange 14, the sidewall of the preformed hole in the tire will be out of engagement with the stud except in respect to such portion of the stud located outside the tool, thus reducing the tendency of the tire to grip and retain the stud and facilitating adjustment of the stud. However, it will be noted that the stud is not moved outwardly of tire merely by the placement of the tool over the stud as described. The revolving of the tool as described is essential and the resulting movement of the stud in a direction outwardly of the tire is sufficiently small in response to a single revolution of the tool that, knowing the amount it is desired to raise the stud, the user may usually be able to locate the stud within the desired range of projection in the first effort. For example, an adjustment of the stud on the order of .020 inch may be obtained for each revolution of the tool and stud. This ratio will depend upon the amount of inclination of the stud during revolution thereof, the size of the flange, and other conditions and characteristics of the overall structure as well as the particular individual using the tool; however in any event the relatively fine ratio of stud movement per revolution will be available to each user. While the foregoing description has dealt with a partial withdrawal of a stud, it will be apparent that the tool and method of this invention may also be used to remove a stud from the tire and move it deeper into the tire.

It will thus be seen that the objects set forth above, among those made apparent from the preceding description, are efficiently attained and, since various changes and modifications may be made in the article, and in carrying out the method, set forth and described above without departing from the scope of the invention, it is intended that all matter contained in the foregoing description or shown in the accompanying drawing shall be interpreted and taken in an illustrative and not in a limiting sense.

It will also be understood that the following claims are intended to cover all of the generic and specific features of the invention herein described, and all statements of the scope of the invention which, as a matter of language, might be said to fall therebetween.

What is claimed is:

1. A method of assembling in a rubber tread of a tire an anti-skid stud having an elongate body portion and a radially projecting anchor portion extending from said body portion and spaced from one end of the stud, comprising the steps of providing a recess in said tread having a radius substantially less than that of said body portion and having a depth substantially less than the overall length of said stud, inserting said stud in said recess with the stud bottomed in said recess and with said one end of the stud being closer to the outer surface of said tread than the other end thereof, and moving said one end of said stud radially outwardly of the axis of said recess, as formed, and revolving said one end of said stud about said axis, thereby to effect movement of said stud in a direction axially outwardly of said recess.

2. A method of effecting movement in a direction axially outwardly of a preformed recess in a rubber tread of a tire, of a rigid anti-skid stud engaged in said recess and having an elongate body portion and a radially outwardly projecting anchor portion spaced from the one end of said body portion disposed closer to the outer surface of said tread and having a radius substantially greater than that of said preformed recess, comprising the steps of effecting an inclining of the longitudinal axis of said stud to the longitudinal axis of said recess as formed, and revolving said one end of the body portion of the stud about said axis of said recess to effect movement of said stud axially outwardly of said recess by means of cooperative engagement between the sidewall of the recess and said anchor portion.

3. A method of effecting movement in a direction axially outwardly of a preformed recess in a rubber tread of a tire of an anti-skid stud having an elongated body at least partially received coaxially within said recess and firmly engaged over a portion thereof by the sidewall of said recess and having an anchor flange disposed between said portion and the inner end of said recess and extending radially outwardly of and circumferentially about said body and engaged within said recess, comprising the steps of disengaging said portion of the body and said sidewall of the recess, and thereafter displacing said stud so that its longitudinal axis is inclined relative to the axis of said recess as formed and revolving the outer end of the stud about said axis.

4. A method of effecting at least partial withdrawal from a preformed recess in the rubber tread of a tire of an anti-skid stud bottomed in said recess and having a body portion with a diameter very substantially greater than the diameter of said recess as formed and having an anchor flange at one end engaged with the sidewall of said recess, said stud being firmly engaged by the sidewall of said recess over at least a portion of the length thereof between said flange and the other end of the stud, said recess having a depth substantially greater than its depth as formed due to forcible seating of said stud in said recess; comprising the steps of disengaging said sidewall and said portion of stud but not said flange and sidewall; and without exerting any substantial force on the stud axially inwardly of the recess, displacing said other end of the stud radially of the axis of said recess as formed and revolving said other end of said stud about said axis.

5. A method of effecting at least partial withdrawal axially outwardly of a preformed recess in a rubber tread of a tire of an anti-skid stud engaged in said recess and having an elongate body portion and a radially outwardly extending anchor flange at one end of said body, said flange being engaged with the sidewall of said recess, the recess as formed having a diameter which is substantially less than the diameter of said body, comprising the steps of telescopically disposing over said other end of the stud and between the stud and sidewall of said recess a tubular member having an outer diameter at the one end thereof next adjacent said flange which is no greater than the diameter of said flange, locating said one end of said tubular member adjacent said flange, and revolving the other end of said tubular member about the axis of said recess as formed with the axis of said tubular member being sufficiently inclined to said axis of the recess so as to effect inclination of the longitudinal axis of said stud relative to said axis of said recess as formed.

References Cited
UNITED STATES PATENTS

| 2,551,652 | 5/1951 | Vreeland | 29—235 |
| 2,704,564 | 3/1955 | Christensen | 152—210 |
| 2,731,714 | 1/1956 | Dudley | 29—427 |

THOMAS H. EAGER, *Primary Examiner.*